(12) United States Patent
Min et al.

(10) Patent No.: US 10,856,108 B2
(45) Date of Patent: Dec. 1, 2020

(54) SYSTEM AND METHOD OF LOCATING A RADIO FREQUENCY (RF) TRACKING DEVICE USING A CALIBRATION ROUTINE

(71) Applicant: Position Imaging, Inc., Portsmouth, NH (US)

(72) Inventors: Guohua Min, Exeter, NH (US); Edward L. Hill, Exeter, NH (US)

(73) Assignee: POSITION IMAGING, INC., Portsmouth, NH (US)

( * ) Notice: Subject to any disclaimer, the term of this patent is extended or adjusted under 35 U.S.C. 154(b) by 78 days.

(21) Appl. No.: 16/356,285

(22) Filed: Mar. 18, 2019

(65) Prior Publication Data

US 2019/0215662 A1    Jul. 11, 2019

Related U.S. Application Data

(63) Continuation-in-part of application No. 15/246,783, filed on Aug. 25, 2016, now Pat. No. 10,237,698.
(Continued)

(51) Int. Cl.
*H04W 4/029* (2018.01)
*H04W 4/02* (2018.01)
(Continued)

(52) U.S. Cl.
CPC .......... *H04W 4/029* (2018.02); *G01S 5/0221* (2013.01); *G01S 5/0242* (2013.01); *G01S 5/0284* (2013.01);
(Continued)

(58) Field of Classification Search
CPC .... G01S 5/0221; G01S 5/0242; G01S 5/0284; G01S 5/0289; G01S 5/10; G01S 5/06; G01S 5/04; G01S 5/021
(Continued)

(56) References Cited

U.S. PATENT DOCUMENTS 2,408,122 A    9/1946  Wirkler
3,824,596 A    7/1974  Guion et al.
(Continued)

FOREIGN PATENT DOCUMENTS

WO    2001006401 A1    1/2001
WO    2005010550 A1    2/2005

OTHER PUBLICATIONS

"ADXL202/ADXL210 Product Sheet", Analog Devices, Inc., Analog. com, 1999.
(Continued)

*Primary Examiner* — Harry K Liu
(74) *Attorney, Agent, or Firm* — Schmeiser, Olson & Watts LLP

(57) ABSTRACT

Position tracking systems and methods for tracking a physical location of a radio frequency (RF) transmitter include an RF transmitter transmitting an RF signal from a plurality of known locations. At least three RF receiver antennae are disposed at undetermined locations within range of the RF transmitter to receive the RF signals transmitted from the plurality of known locations. A receiver station in communication with the at least three RF receiver antennae initially calibrates a relative position of each RF receiver antenna with respect to the other RF receiver antennae based on the plurality of known locations and on information acquired in response to the RF signals received at the at least three RF receiver antennae.

20 Claims, 7 Drawing Sheets

Related U.S. Application Data which is a continuation of application No. 14/158,896, filed on Jan. 20, 2014, now Pat. No. 9,482,741.

(60) Provisional application No. 61/754,402, filed on Jan. 18, 2013.

(51) Int. Cl.
*G01S 5/10* (2006.01)
*G01S 5/02* (2010.01)
*H04L 29/08* (2006.01)
*G01S 5/06* (2006.01)
*H04L 29/06* (2006.01)

(52) U.S. Cl.
CPC .............. *G01S 5/0289* (2013.01); *G01S 5/06* (2013.01); *G01S 5/10* (2013.01); *H04L 67/34* (2013.01); *H04W 4/023* (2013.01); *H04L 67/38* (2013.01)

(58) Field of Classification Search
USPC ......................................................... 342/465
See application file for complete search history.

(56) References Cited

U.S. PATENT DOCUMENTS

| | | |
|---|---|---|
| 3,940,700 A | 2/1976 | Fischer |
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,259,398 B1 * | 7/2001 | Riley ................ G01S 19/44 342/357.26 |
| 6,292,750 B1 | 9/2001 | Lin |
| 6,409,687 B1 | 6/2002 | Foxlin |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison, Jr. et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,868,760 B2 | 1/2011 | Smith et al. |
| 7,876,268 B2 | 1/2011 | Jacobs |
| 7,933,730 B2 | 4/2011 | Li et al. |
| 8,269,624 B2 | 9/2012 | Chen et al. |
| 8,457,655 B2 | 6/2013 | Zhang et al. |
| 8,749,433 B2 | 6/2014 | Hill |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander et al. |
| 9,141,194 B1 | 9/2015 | Keyes et al. |
| 9,174,746 B1 | 11/2015 | Bell et al. |
| 9,482,741 B1 | 11/2016 | Min et al. |
| 9,497,728 B2 | 11/2016 | Hill |
| 9,519,344 B1 | 12/2016 | Hill |
| 9,782,669 B1 | 10/2017 | Hill |
| 9,872,151 B1 | 1/2018 | Puzanov et al. |
| 9,933,509 B2 | 4/2018 | Hill et al. |
| 9,961,503 B2 | 5/2018 | Hill |
| 10,001,833 B2 | 6/2018 | Hill |
| 10,180,490 B1 | 1/2019 | Schneider et al. |
| 10,257,654 B2 | 4/2019 | Hill |
| 10,639,017 B2 * | 5/2020 | Navab ................ A61B 6/032 |
| 2002/0021277 A1 | 2/2002 | Kramer et al. |
| 2002/0140745 A1 | 10/2002 | Ellenby et al. |
| 2002/0177476 A1 | 11/2002 | Chou |
| 2003/0053492 A1 | 3/2003 | Matsunaga |
| 2003/0120425 A1 | 6/2003 | Stanley et al. |
| 2003/0176196 A1 | 9/2003 | Hall et al. |
| 2003/0195017 A1 | 10/2003 | Chen et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2005/0001712 A1 | 1/2005 | Yarbrough |
| 2005/0057647 A1 | 3/2005 | Nowak |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1 | 2/2006 | Krishna et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0122495 A1 * | 6/2006 | Kienzle, III ............ G01S 5/02 600/424 |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0007398 A1 | 1/2008 | DeRose et al. |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0174485 A1 | 7/2008 | Carani |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0149202 A1 | 6/2009 | Hill et al. |
| 2009/0224040 A1 | 9/2009 | Kushida et al. |
| 2009/0243932 A1 | 10/2009 | Moshfeghi |
| 2009/0295648 A1 * | 12/2009 | Dorsey ................ H01Q 21/28 343/702 |
| 2009/0323586 A1 | 12/2009 | Hohl et al. |
| 2010/0013664 A1 | 1/2010 | Zierolf |
| 2010/0090852 A1 | 4/2010 | Eitan |
| 2010/0097208 A1 | 4/2010 | Rosing et al. |
| 2010/0103173 A1 | 4/2010 | Lee et al. |
| 2010/0103989 A1 | 4/2010 | Smith et al. |

(56) References Cited

U.S. PATENT DOCUMENTS

| | | |
|---|---|---|
| 2010/0123664 A1 | 5/2010 | Shin et al. |
| 2010/0159958 A1 | 6/2010 | Naguib et al. |
| 2011/0006774 A1 | 1/2011 | Baiden |
| 2011/0037573 A1 | 2/2011 | Choi |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2012/0013509 A1 | 1/2012 | Wisherd et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0286933 A1 | 11/2012 | Hsiao |
| 2012/0319822 A1 | 12/2012 | Hansen |
| 2012/0326923 A1* | 12/2012 | Oehler .................. G01S 5/0284 342/357.29 |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1 | 2/2013 | Faith |
| 2013/0113993 A1 | 5/2013 | Dagit, III |
| 2013/0281084 A1 | 10/2013 | Batada et al. |
| 2013/0314210 A1 | 11/2013 | Schoner et al. |
| 2014/0022058 A1 | 1/2014 | Striemer et al. |
| 2014/0253368 A1 | 9/2014 | Holder |
| 2014/0300516 A1 | 10/2014 | Min et al. |
| 2014/0361078 A1 | 12/2014 | Davidson |
| 2015/0009949 A1 | 1/2015 | Khoryaev et al. |
| 2015/0039458 A1 | 2/2015 | Reid |
| 2015/0091757 A1 | 4/2015 | Shaw et al. |
| 2015/0130664 A1 | 5/2015 | Hill et al. |
| 2015/0133162 A1 | 5/2015 | Meredith et al. |
| 2015/0134418 A1 | 5/2015 | Leow et al. |
| 2015/0169916 A1 | 6/2015 | Hill et al. |
| 2015/0221135 A1 | 8/2015 | Hill et al. |
| 2015/0323643 A1 | 11/2015 | Hill et al. |
| 2015/0362581 A1 | 12/2015 | Friedman et al. |
| 2015/0379366 A1 | 12/2015 | Nomura et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0238692 A1 | 8/2016 | Hill et al. |
| 2016/0256100 A1 | 9/2016 | Jacofsky et al. |
| 2016/0286508 A1 | 9/2016 | Khoryaev et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0123426 A1 | 5/2017 | Hill et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0323174 A1 | 11/2017 | Joshi et al. |
| 2017/0323376 A1 | 11/2017 | Glaser et al. |
| 2017/0350961 A1 | 12/2017 | Hill et al. |
| 2017/0372524 A1 | 12/2017 | Hill |
| 2018/0068266 A1 | 3/2018 | Kirmani et al. |
| 2018/0164103 A1 | 6/2018 | Hill |
| 2018/0197139 A1 | 7/2018 | Hill |
| 2018/0231649 A1 | 8/2018 | Min et al. |
| 2018/0242111 A1 | 8/2018 | Hill |
| 2019/0090744 A1 | 3/2019 | Mahfouz |

OTHER PUBLICATIONS

Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).

Schmidt and Phillips, "INS/GPS Integration Architectures", NATO RTO Lecture Seriers, First Presented Oct. 20-21, 2003; 24 pages.
Welch, Greg and Gary Bishop "An Introduction to the Kalman Filter, TR95-041," Department of Computer Science, University of North Carolina at Chapel Hill, Chapel Hill, NC 27599-3175, Updated: Monday, Jul. 24, 2006.
Non-Final Office Action in U.S. Appl. No. 14/158,896 dated May 23, 2016; 8 pages.
Notice of Allowance in U.S. Appl. No. 14/158,896 dated Jul. 12, 2016; 5 pages.
Non-Final Office Action in U.S. Appl. No. 15/246,783 dated Aug. 1, 2018; 9 pages.
Notice of Allowance in U.S. Appl. No. 15/246,783 dated Dec. 28, 2018; 5 pages.
Wilde, Andreas, "Extended Tracking Range Delay-Locked Loop," Proceedings IEEE International Conference on Communications, Jun. 1995, pp. 1051-1054.
Schumacher, Adrian "Integration of a GPS aided Strapdown Inertial Navigation System for Land Vehicles", Master of Science Thesis, KTH Electrical Engineering, 2006; 67 pages.
Sun, Debo "Ultra-Tight GPS/Reduced IMU for Land Vehicle Navigation", Mar. 2010, UCGE Reports No. 20305; 254 pages.
Farrell and Barth, "The Global Positioning System & Interial Navigation", 1999, McGraw-Hill; pp. 245-252.
Farrell, et al. "Real-Time Differential Carrier Phase GPS-Aided INS", Jul. 2000, IEEE Transactions on Control Systems Technology, vol. 8, No. 4; 13 pages.
Filho, et al. "Integrated GPS/INS Navigation System Based on a Gyroscope-Free IMU", DINCON Brazilian Conference on Synamics, Control, and Their Applications, May 22-26, 2006; 6 pages.
Goodall, Christopher L., "Improving Usability of Low-Cost INS/GPS Navigation Systems using Intelligent Techniques", Jan. 2009, UCGE Reports No. 20276; 234 pages.
Gautier, Jennifer Denise "Gpsiins Generalized Evaluation Tool (GIGET) for the Design and Testing of Integrated Navigation Systems", Dissertation, Stanford University, Jun. 2003; 160 pages.
Grewal and Andrews "Global Positioning Systems, Inertial Navigation, and Integration" Section 8.6-8.6.3.1, 2001, John Weiley and Sons, pp. 252-256.
Hill, et al. "Package Tracking Systems and Methods," U.S. Appl. No. 15/091,180 filed Apr. 5, 2016.
Hill, et al. "Video for Real-Time Confirmation in Package Tracking Systems," U.S. Appl. No. 15/416,366 filed Jan. 26, 2017.
Gao, Jianchen "Development of a Precise GPS/INS/On-Board Vehicle Sensors Integrated Vehicular Positioning System", Jun. 2007, UCGE Reports No. 20555; 245 pages.
Piotrowski, et al. "Light-Based Guidance for Package Tracking Systems," U.S. Appl. No. 15/416,379 filed Jan. 26, 2017.
Pourhomayoun, Mohammad and Mark Fowler "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.
Proakis, John G. and Masoud Salehi, "Communication Systems Engineering", Second Edition, Prentice-Hall, Inc., Upper Saddle River, New Jersey, 2002; 815 pages.
Alban, Santago "Design and Performance of a Robust GPS/INS Attitude System for Automobile Applications", Dissertation, Stanford University, Jun. 2004; 218 pages.
Li, Xin, et al. "Multifrequency-Based Range Estimation of RFID Tags," 2009, IEEE.
Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.
Vikas Numar N. "Integration of Inertial Navigation System and Global Positioning System Using Kalman Filtering", M.Tech Dissertation, Indian Institute of Technology, Bombay, Mumbai, Jul. 2004; 69 pages.
Yang, Yong "Tightly Coupled MEMS INS/GPS Integration with INS Aided Receiver Tracking Loops", Jun. 2008, UCGE Reports No. 20270; 205 pages.

(56) References Cited

OTHER PUBLICATIONS

Morbella N50: 5-inch GPS Navigator User's Manual, Maka Technologies Group, May 2012.

* cited by examiner

SYSTEM AND METHOD OF LOCATING A RADIO FREQUENCY (RF) TRACKING DEVICE USING A CALIBRATION ROUTINE

RELATED APPLICATIONS

This application is a continuation-in-part application of co-pending U.S. patent application Ser. No. 15/246,783, filed Aug. 25, 2016, titled "System and Method of Locating a Radio Frequency (RF) Tracking Device using a Calibration Routine", which is a continuation application of patented U.S. patent application Ser. No. 14/158,896, filed Jan. 20, 2014, titled "System and Method of Locating a Radio Frequency (RF) Tracking Device using a Calibration Routine", U.S. Pat. No. 9,482,741, which claims the benefit of and priority to U.S. provisional application No. 61/754,402, filed Jan. 18, 2013, titled "Method of Locating RFID Tags Using a Calibration Template," the entireties of which applications are incorporated by reference herein.

FIELD OF THE INVENTION

The invention relates generally to systems and methods of radio frequency (RF) communication. More particularly, the invention relates to systems and methods for tracking the position of RF transmitting devices.

BACKGROUND

In certain applications that track the positions or motion of a mobile transmitter or transducer (i.e., tracked device), it would be helpful to provide a simple, economical means to improve tracking accuracies without the need for complicated or costly receiver network setup or calibration procedures. One commonly used method to track the positions of tracked devices is implemented in current wireless networks that track RFID tags in buildings, on campuses and commercial environments. The tracking in said networks is made possible by placing multiple receivers throughout the tracked area. The receivers identify the signals of the tracked device and use signal amplitude levels to determine rough ranges, typically measured in feet or meters, between the tracked devices and the receivers within the signal reception range of the tracked devices. High accuracy cannot be obtained using signal amplitude, and receivers need to be located at positions on a mapped layout of the building, campus, etc.

The kind of signal strength ranging system described above can work well in an environment that does not require high accuracy position detection for the tracked devices or very fast and accurate receiver position calibration. However, in some applications, requirements may be much more demanding with inch or even sub-millimeter accuracy requirements and fast, easy receiver setup for operation.

Certain computer-based virtual reality applications that track the position of a controller (guns in gaming applications, surgical probes in image guided surgery applications, etc.) require high tracking accuracy of the actual position of the tracked device. Since in these virtual reality applications the device would be registered with screen images provided by software, very high position accuracies are required to provide realistic interaction between the user (i.e., tracked device) and the software program. For applications with high accuracy requirements, simple amplitude detection would not be adequate.

SUMMARY

All examples and features mentioned below can be combined in any technically possible way.

In one aspect, the invention is related to a calibration system for calibrating a position tracking system used to track a physical location of a radio frequency (RF) transmitter. The calibration system comprises an RF transmitter that transmits an RF signal from each of a plurality of locations where the RF transmitter is placed in successive order. At least three RF receiver antennae disposed at undetermined locations receive the RF signals transmitted from the plurality of locations. A calibration apparatus is configured to provide a calibration template with a predetermined set of reference points. Each reference point corresponds to one of the plurality of locations where the RF transmitter is placed in successive order and from which the RF transmitter transmits the RF signal. A receiver station in communication with the at least three RF receiver antennae is configured to know where each reference point is located on the calibration template. The receiver station initially calibrates a relative position of each RF receiver antenna with respect to each other RF receiver antenna based on the plurality of locations and on information acquired in response to the RF signal transmitted by the RF transmitter from each of the plurality of locations and received by the at least three RF receiver antennae.

In one embodiment, the set of reference points comprises three or more reference points.

In one embodiment, each RF signal transmitted by the RF transmitter carries a timestamp corresponding to when the RF transmitter transmitted that RF signal and each of the at least three receiver antennae generates a timestamp corresponding to when that receiver antenna received that RF signal from the RF transmitter. A processing unit is configured to compute time of arrival measurements for each RF signal transmitted by the RF transmitter based on the timestamp carried by that RF signal and on the timestamps generated by each of the at least three RF receiver antennae when that receiver antenna received that RF signal from the RF transmitter.

The calibration system may further comprise a device that includes the RF transmitter, an RF receiver configured to receive RF signals from the at least three receiver antennae that carry the timestamps generated by the at least three receiver antennae, and the processing unit that computes the time of arrival measurements.

The processing unit of the device may compute a position of the device based on the time of arrival measurements.

The receiver station may be in wireless communication with the device to receive the time of arrival measurements computed by the processing unit of the device. The receiver station may comprise a computing system that determines the relative position of each RF receiver antenna with respect to each other RF receiver antenna based on the computed time of arrival measurements. The receiver station may be in wireless communication with the device to receive the timestamp carried by each RF signal transmitted by the RF transmitter and the timestamps generated by each of the at least three RF receiver antennae when that receiver antenna received that RF signal from the RF transmitter. The receiver station may comprise the processing unit that computes the time of arrival measurements based on the received timestamps.

The receiver station may be configured to compute dynamically a position of an RF-transmitting device based on the calibrated relative positions of the RF receiver antennae.

In another embodiment, the set of reference points comprises at least four reference points, the at least three receiver antennae comprises at least four receiver antennae, each RF signal carries a timestamp corresponding to when the RF transmitter transmitted that RF signal, each of the at least four receiver antennae generates a timestamp corresponding to when that receiver antenna received that RF signal from the RF transmitter, and the receiver station computes time difference of arrival measurements based on the plurality of locations and on the timestamps and determines the relative position of each of the at least four RF receiver antennae with respect to each other of the at least four RF receiver antennae based on the computed time difference of arrival measurements and on the plurality of locations.

In another aspect, the invention relates to a method for calibrating a position tracking system used to track a physical location of a radio frequency (RF) transmitter. The method comprises receiving, by at least three RF receiver antennae disposed at undetermined locations, an RF signal transmitted from each of a plurality of locations in successive order by an RF transmitter, positioning a calibration template with a predetermined set of reference points at known locations relative to a given reference point such that each reference point of the predetermined set of reference points corresponds to one of the plurality of locations from which the RF transmitter transmits the RF signal, and calibrating a relative position of each of the at least three RF receiver antennae with respect to each other of the at least three RF receiver antennae based on the plurality of locations and information acquired in response to the RF signals received at the at least three RF receiver antennae.

The set of reference points may comprise three or more reference points. Each RF signal transmitted by the RF transmitter may carry a timestamp corresponding to when the RF transmitter transmitted that RF signal and each of the at least three receiver antennae may generate a timestamp corresponding to when that receiver antenna received that RF signal from the RF transmitter. In one embodiment, time of arrival measurements are computed for each RF signal transmitted by the RF transmitter based on the timestamp carried by that RF signal and on the timestamps generated by each of the at least three RF receiver antennae when that receiver antenna received that RF signal from the RF transmitter. A position of the tracked device may be computed based on the time of arrival measurements.

A position of the RF transmitter relative to the at least three receiver antennae may be computed based on the calibrated relative positions of the at least three receiver antennae.

In another embodiment, the set of reference points comprises at least four reference points and the at least three receiver antennae comprises at least four receiver antennae, and the method further comprises carrying a timestamp in each RF signal transmitted by the RF transmitter that corresponds to when the RF transmitter transmitted that RF signal and generating, by each of the at least four receiver antennae, a timestamp corresponding to when that receiver antenna received that RF signal from the RF transmitter, computing time difference of arrival measurements based on the plurality of locations and on the timestamps, and determining the relative position of each of the at least four RF receiver antennae with respect to each other of the at least four RF receiver antennae based on the computed time difference of arrival measurements and on the plurality of locations.

In still another aspect, the invention relates to a calibration system for calibrating a position tracking system used to track a physical location of a radio frequency (RF)-transmitting tracked device, the position tracking system having at least three RF receiver antennae. The calibration system comprises a receiver station in communication with the at least three RF receiver antennae disposed at undetermined locations. The receiver station is configured to compute a set of timing measurements for each of at least three different transmissions of RF signals transmitted from at least three different locations in successive order by the RF-transmitting tracked device and received at each of the at least three RF receiver antennae. The receiver station is further configured to store in memory a position location for each of the at least three different locations, to associate each set of timing measurements with one of the at least three different locations, and to compute a relative position of each of the at least three RF receiver antennae with respect to each other of the at least three RF receiver antennae based on the at least three different locations and the sets of timing measurements. The calibration system also comprises a calibration apparatus configured to provide a calibration template with a predetermined set of reference points. The calibration apparatus is disposed relative to the receiver station such that each reference point is located at a different one of the at least three position locations stored in the memory and corresponds to one of the at least three different locations from which the RF-transmitting tracked device transmitted RF signals.

In one embodiment, each RF signal transmitted by the RF-transmitting tracked device carries a timestamp corresponding to when the RF-transmitting tracked device transmitted that RF signal, each of the at least three receiver antennae generates a timestamp corresponding to when that receiver antenna received that RF signal from the RF-transmitting tracked device, and the receiver station is configured to compute time of arrival measurements for each RF signal transmitted by the RF-transmitting tracked device based on the timestamp carried by that RF signal and on the timestamps generated by each of the at least three RF receiver antennae when that receiver antenna received that RF signal from the RF transmitter.

In one embodiment, the predetermined set of reference points comprises at least four reference points, the at least three RF receiver antennae comprises at least four RF receiver antennae, each RF signal transmitted by the RF-transmitting tracked device carries a timestamp in that corresponds to when the RF transmitter transmitted that RF signal and each of the at least four receiver antennae generates a timestamp corresponding to when that receiver antenna received that RF signal transmitted by the RF-transmitting tracked device, and the receiver station is configured to compute time difference of arrival measurements based on the position locations and on the timestamps and to determine the relative position of each of the at least four RF receiver antennae with respect to each other of the at least four RF receiver antennae based on the computed time difference of arrival measurements and on the position locations.

The receiver station may be configured to compute the physical location of the RF-transmitting tracked device based on the computed relative positions of the at least three RF receiver antennae.

DETAILED DESCRIPTION

Figure 1:
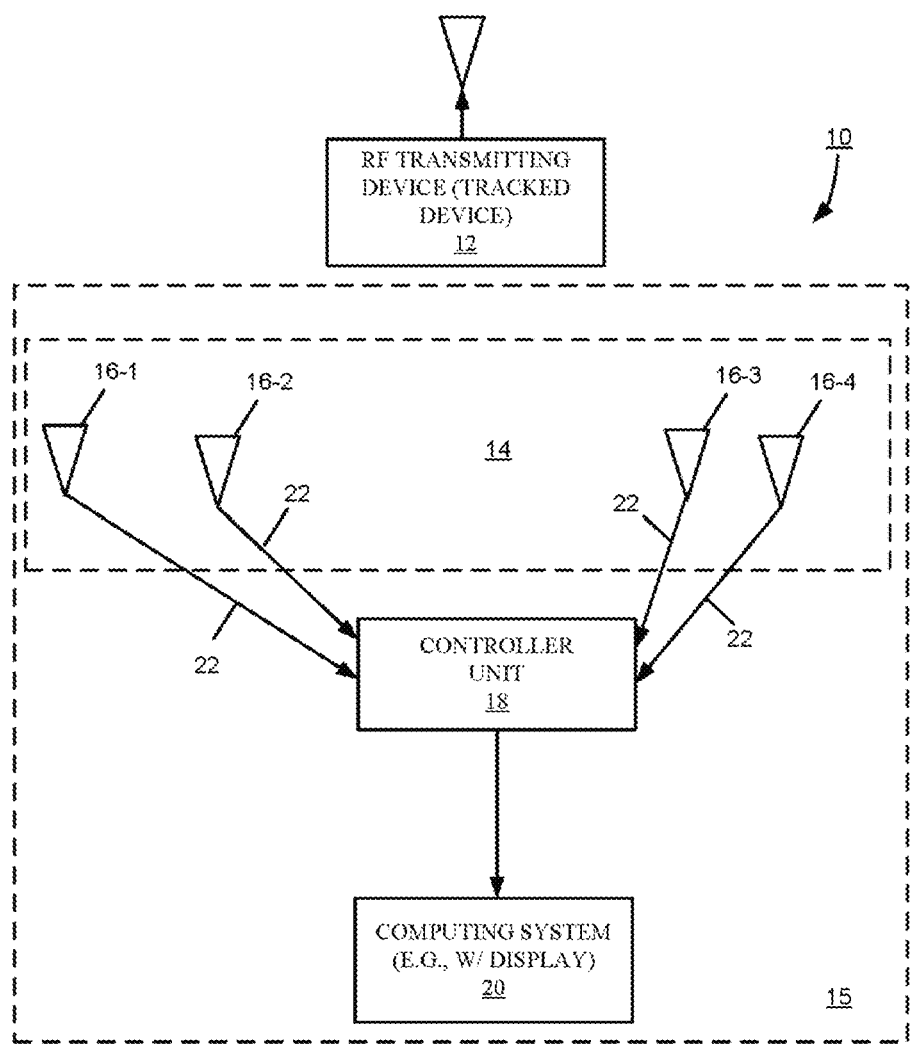
FIG. 1 is a diagram showing an embodiment of a position tracking system.

Described herein are RF communication systems and methods that can help quickly and accurately calculate and calibrate the relative positions of RF receivers, even if such RF receivers are randomly located within the tracking environment (e.g., a room, area, or region). Such RF communication systems include a receiver network of four or more receiver antennae that receive radio transmissions from one or more wireless mobile transmitters or transceivers (referred to as a tracked device) that transmit a radio-based signal to the receiver network; and a receiver station that computes the relative position of each tracked device using time difference of arrival of the signals of the tracked device received by each receiver antenna.

In the RF communication system, the receiver station can compute the relative position of the individual receiver antenna through a self-calibration process that utilizes a template to guide the tracked device, in a three-dimensional environment, to predetermined reference points. As the tracked device moves to each known reference point on the template, the receiver station can use these points to calibrate the relative location of each receiver antenna by utilizing the time difference of arrival information of the received signals to develop a relative geometric layout of the receiver antennae in the receiver network.

For example, in one example configuration, a tracked device transmits a signal that is received by at least four receiver antennae. To calculate the relative positions of each individual receiver antenna in the receiver network, the tracked device is placed on or in a unique calibration template. This template contains a number of known (by the receiver station) three-dimensional geometric reference points that the tracked device fits in or on and is moved through a predetermined sequence of locations. As the tracked device is moved to each point on the template, the multiple receiver antennae receive the signal of the tracked device and the receiver station, by using the known geometry of the reference points on the template and comparing that information with the time difference of arrival of the signal of the tracked device received at each receiver antenna, then computes the individual receiver antenna location.

In one embodiment, the tracked device has a button that sends a predetermined signal to the receiver station. As the tracked device is placed at each reference point of the template, the button is pressed to notify the receiver station to record that position point and reference it to the known position reference points known by the receiver station. After the tracked device has been placed at each reference point and each reference point has been recorded by the receiver station, the receiver station has calibrated the relative positions of the receiver antennae. After the positions of the receiver antennae have been calibrated, the receiver station can use the time difference of arrival of the radio signal to determine the three-dimensional position of the tracked device relative to the receiver network.

FIG. 1 shows an embodiment of a wireless position tracking system 10 for tracking the position of an RF transmitter (i.e., tracked device) 12. The tracked device 12 may be carried by, attached to, or embedded in an object whose position (x, y, z) is to be dynamically determined, and may be part of a transceiver or transducer. Examples of such objects include, but are not limited to, game controllers, TV remote control devices, mobile smart phones, laptop computers, and electronic tablets. The position tracking system 10 includes a receiver network 14 comprised of at least four RF receiver antennae 16-1, 16-2, 16-3, and 16-4 (generally, 16), whose relative positions ($X_i$, $Y_i$, $Z_i$) are unknown (randomly placed), where i corresponds to the number of a particular antenna. Each receiver antenna 16 of the receiver network 16 is located near the RF transmitter 12. At least four RF receiver antennae and one RF transmitter are required for determining the three-dimensional position of the tracked device 12 within the tracking environment.

For calibrating the positions of the receiver antennae 16, a calibration template with a known geometry and test point locations is used for the RF transmitter. As the RF transmitter is moved to each test point on the calibration template, the position tracking system 10 uses the predetermined, known positions to determine the relative positions of the receiver antenna in the receiver network 14.

The wireless position tracking system 10 further includes a receiver station 15 comprised of a controller unit 18 and a computing system 20 (optionally, with a display). During operation, the RF transmitter 12 associated with an object continuously transmits PN (pseudo noise) code modulated RF signals, and the receiver network 14 of receiver antennae 16 receives the modulated signals from RF transmitter 12. The modulated signals are sent to the controller unit 18 over wires or cables 22. The data obtained from controller unit 18 are sent to the computing system 20, which comprises memory and a processor configured to calculate the transmitter antenna position (x, y, z), and then to represent the calculated position on the display screen or to provide the calculated position to other applications for further use. Examples of a system and method for calculating the three-dimensional position of the Tracked Device are described in U.S. application Ser. No. 13/079,800, filed Apr. 4, 2011, and titled "Multiplexing Receiver System," the entirety of which is incorporated by reference herein; examples of a system and method for registering the position of the Tracked Device within a software program are described in U.S. application Ser. No. 13/918,295, filed Jun. 14, 2013, and titled "RF Tracking with Active Sensory Feedback," the entirety of which is incorporated by reference herein.

Figure 2:
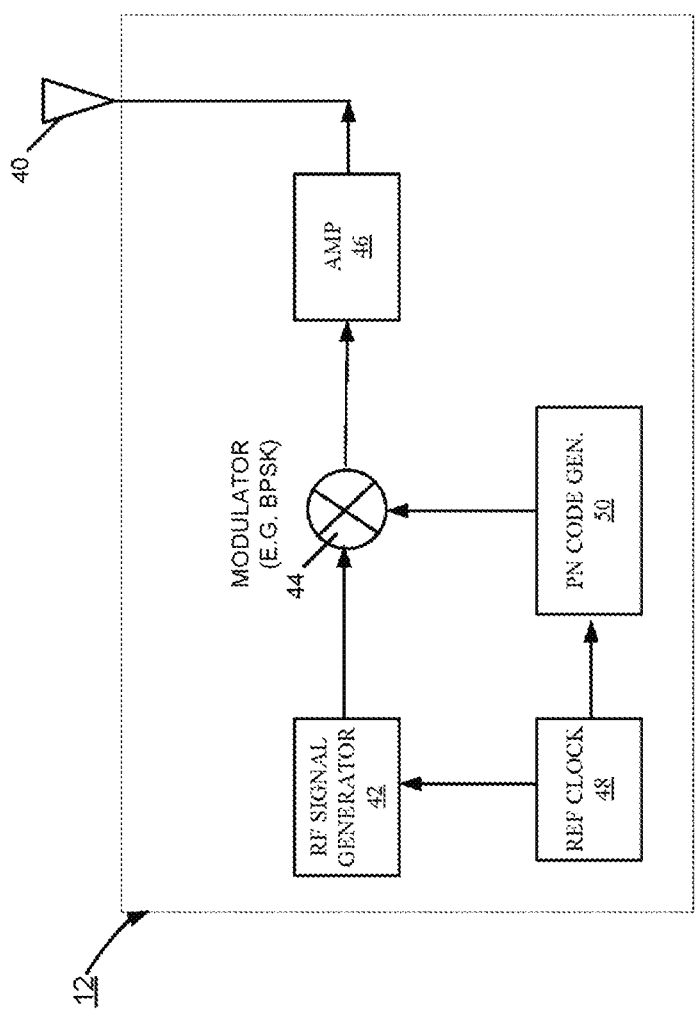
FIG. 2 is a block diagram of an embodiment of a transmitter carried by, attached to, or embedded on an object.

FIG. 2 shows an embodiment of an RF transmitter 12, including an antenna 40, a RF signal generator 42, a modulator 44, an amplifier 46, and a reference oscillator (clock) 48. The RF transmitter 12, which is associated with an object, also has a pseudo-noise (PN) code generator 50 that generates PN signals intrinsic to the object. The reference oscillator 48 provides a stable reference oscillator signal for the PN code generator 50 and the RF signal generator 42. The reference oscillator 48 uses a phase lock loop to generate the stable RF signal.

The modulator 44 (e.g., a Bi-Phase Shift Key (BPSK) modulator) provides a modulated signal to be transmitted through the amplifier 46 and transmitter antenna 40. In one embodiment, the carrier frequency is 2.4 GHz and the PN code chip rate is 80 MHz. The carrier frequency can operate in any other frequency and the PN code chip rate can also be set at other rates.

Figure 3:
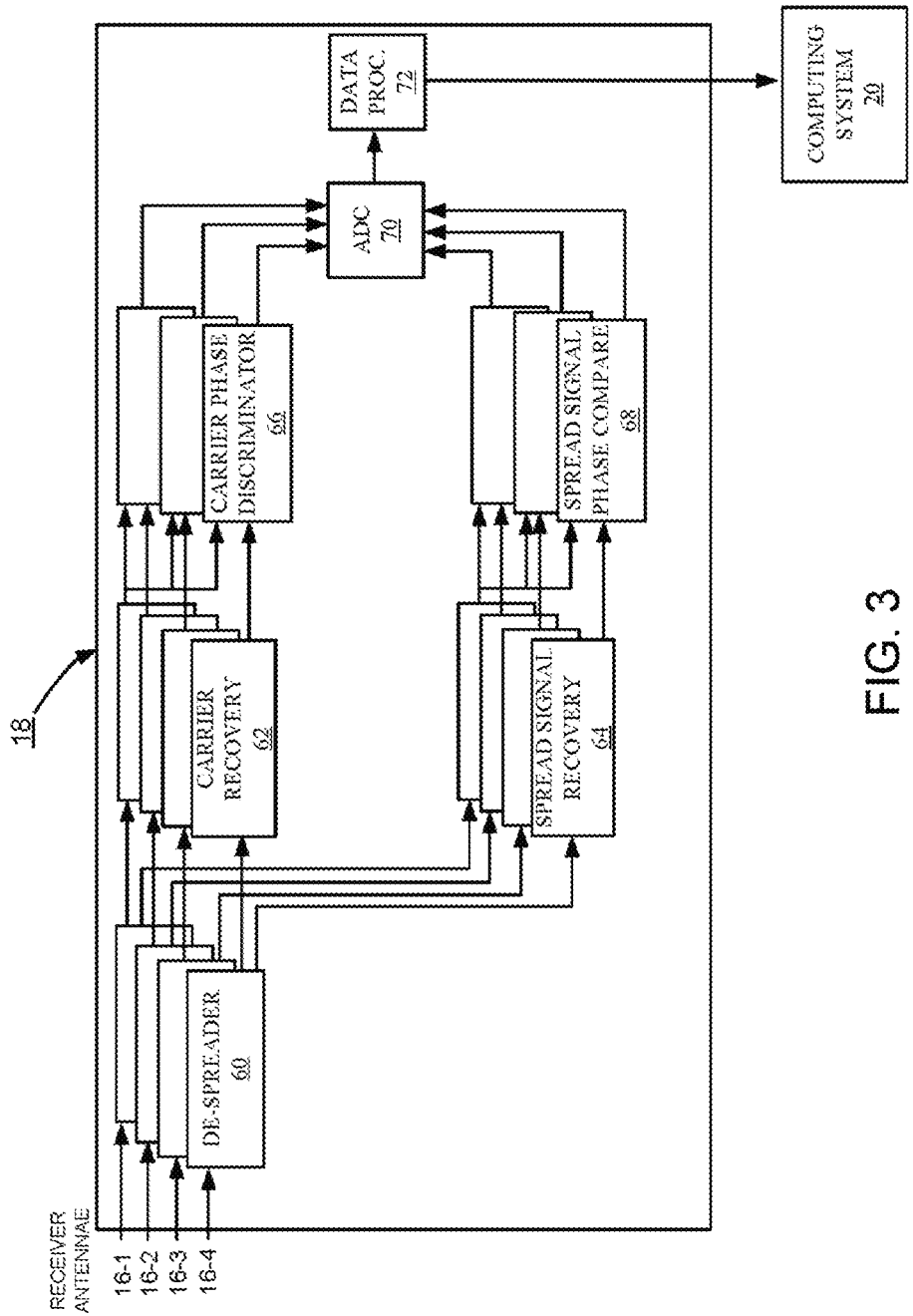
FIG. 3 is a block diagram of an embodiment a single receiver within the plurality of networked receivers.

FIG. 3 shows an embodiment of the controller unit 18, including de-spreader circuitry 60, carrier frequency recovery circuitry 62, spread signal recovery circuitry 64, carrier frequency phase discriminator circuitry 66, spread signal frequency phase comparison circuitry 68, an analog-to-digital converter (ADC) circuit 70, and data processing circuitry 72. The de-spreader circuitry 60 includes a de-spreader circuit for each of the receiver antennae 16. Each de-spreader circuit de-spreads the modulated signal received from its associated receiver antenna 16. Each de-spreader circuit passes its de-spread signal to a carrier frequency recovery circuit 62 and to a spread signal (i.e., code) recovery circuit 64. Each carrier frequency recovery circuitry 62 recovers the carrier signal and each spread signal frequency recovery circuitry 64 recovers the spread signal (a set of PN code correlative pulses) through a correlation process.

The recovered carrier signal and spread signal are sent to the carrier frequency phase discriminator circuitry 66 and to the spread signal phase comparison circuitry (i.e., code discriminator) 68, respectively, to compare the phase differences between the receiver antennae 16. One of the receiver antennae 16 serves as a reference channel. In the embodiment shown, the receiver antenna 16-1 is chosen to be the reference channel. The carrier frequency discriminator circuits 66 determine the phase differences between the receiver antenna 16-2 and receiver antenna 16-1, receiver antenna 16-3 and receiver antenna 16-1, and receiver antenna 16-4 and receiver antenna 16-1 for the carrier signal; and the spread signal phase comparison circuitry 68 determines the phase differences between the receiver antenna 16-2 and receiver antenna 16-1, receiver antenna 16-3 and receiver antenna 16-1, and receiver antenna 16-4 and receiver antenna 16-1 for the spread signal. The spread signal phase compare circuitry 68 and carrier phase discriminator circuitry 66 provide the coarse and fine measurement of the time difference of arrival of the transmitted RF signal, respectively. Combining the coarse and fine time differences of arrival eliminates ambiguity and provides highly accurate position determination.

The ADC 70 receives the carrier phase from the carrier phase discriminator circuitry 66 and the spread signal phase from the spread signal phase compare circuitry 68 and converts these phases into digital form. The data processor 72 receives the digitized phases and computes time difference of arrival using the difference in phase measurements (i.e., carrier phase minus spread signal phase) between each receiver antenna and the reference antenna (e.g., 16-1), and sends the time difference of arrival measurements to the computing system 20.

Figure 4:
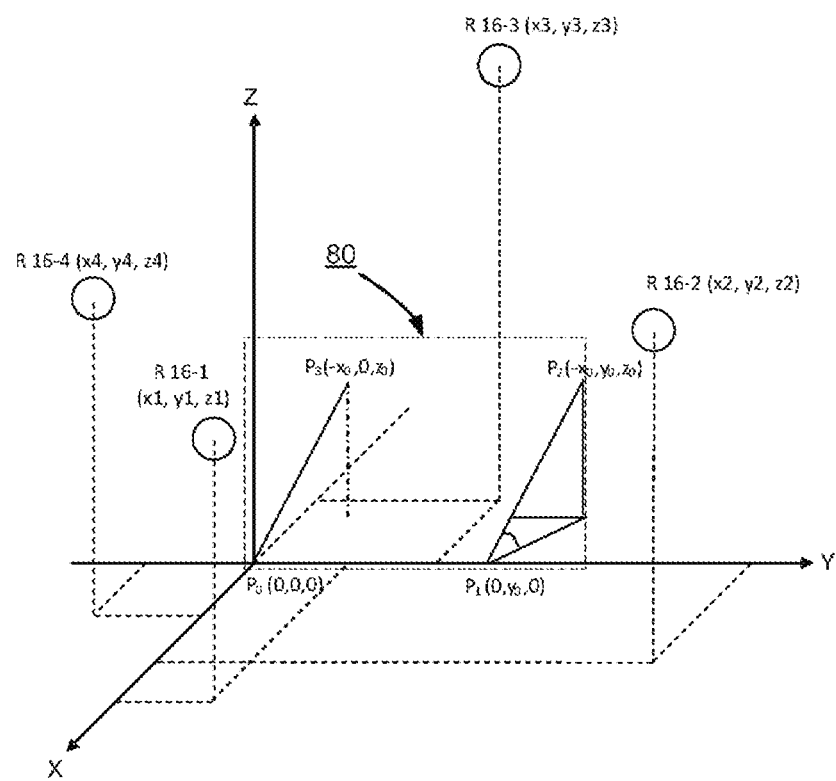
FIG. 4 is a diagram of an embodiment of randomly positioned receiver antennae and the transmitter calibration template.

FIG. 4 shows an example of randomly mounted receiver antennae 16 and a calibration apparatus 80. In this example, the receiver antenna 16-1 is positioned at $(x_1, y_1, z_1)$, the receiver antenna 16-2 is at $(x_2, y_2, z_2)$, the receiver antenna 16-3 is at $(x_3, y_3, z_3)$, and the receiver antenna 16-4 is at $(x_4, y_4, z_4)$, all of which are random locations (i.e., initially unknown) with respect to the calibration apparatus 80. The calibration apparatus 80 can be one or more devices, machines separate from or part of the receiver station 15, examples of which include, but are not limited to, a television and computer monitor. The calibration apparatus 80 provides a calibration template, defined as a plurality of geometric reference points on or in the calibration apparatus 80 known to the receiver station 15. For example, each of the corners of a computer monitor can be adapted to be part of a calibration template, used to calibrate the position tracking system for certain functions as such functions relate to the dimensions of this calibration apparatus. In a computer shooter game that uses the computer monitor for game play display, the corners of the display screen can be calibrated to record the shooting range. During an initial calibration of the positions of the receiver antenna, the tracked device 12 is placed, in succession, at each of these reference points, either on, in, or against the calibration apparatus. Each of the receiver antennae 16 receives the RF signals transmitted by the tracked device. Time difference of arrival measurements between receiver antennae 16 are used to calculate the relative positions of each receiver antenna 16 in the receiver network 14.

In the example shown, the calibration template includes four predetermined locations, referred to as reference points $P_0$, $P_1$, $P_2$, and $P_3$. $P_0$ is placed located at the origin $(0, 0, 0)$, and the other positions $P_1$, $P_2$ and $P_3$ of the calibration template are located at $(0, y_0, 0)$, $(x_0, y_0, z_0)$, and $(x_0, 0, z_0)$, respectively. Each of these reference points is known to the receiver station 15, being stored in the memory of the receiver station. More than four points can be used as reference points, for example, at the middle of each edge of the calibration apparatus 80. In an embodiment with four receiver antennae 16, there are 12 unknown parameters, and, therefore, at least 12 equations are needed to resolve the relative position of each receiver antenna 16. At each calibration reference point P, there are three equations, so at least 4 calibration reference points are needed.

The computing system 20 using the following simultaneous equations to compute locations of the receiver antennae 16, where $f_1$ through $f_{12}$ are the distance differences of antennae locations in relation to the calibration reference points $P_0$-$P_3$. For example, $f_1$, $f_4$, $f_7$, and $f_{10}$ are the distance differences between receiver antennae 16-1 and 16-2 for reference points $P_0$, $P_1$, $P_2$, and $P_3$, respectively; $f_2$, $f_5$, $f_8$, and $f_{11}$ are the distance difference measurements between receiver antennae 16-1 and 16-3, and $f_3$, $f_6$, $f_9$, and $f_{12}$ are the distance difference measurements between receiver antennae 16-1 and 16-4. Using the distance difference, carrier frequency, and speed of light constant, the time difference of arrival is then calculated using the equation: $(t_{1-12}=f_{1-12}/c)$, where c is the speed of light.

At calibration reference point $P_0$:

$$f_1 = \sqrt{x_2^2 + y_2^2 + z_2^2} - \sqrt{x_1^2 + y_1^2 + z_1^2} \qquad \text{(Eq. 1)}$$

$$f_2 = \sqrt{x_3^2 + y_3^2 + z_3^2} - \sqrt{x_1^2 + y_1^2 + z_1^2} \qquad \text{(Eq. 2)}$$

$$f_3 = \sqrt{x_4^2 + y_4^2 + z_4^2} - \sqrt{x_1^2 + y_1^2 + z_1^2} \qquad \text{(Eq. 3)}$$

At calibration reference point $P_1$:

$$f_4 = \sqrt{x_2^2 + (y_2 - y_0)^2 + z_2^2} - \sqrt{x_1^2 + (y_1 - y_0)^2 + z_1^2} \qquad \text{(Eq. 4)}$$

$$f_5 = \sqrt{x_3^2 + (y_3 - y_0)^2 + z_3^2} - \sqrt{x_1^2 + (y_1 - y_0)^2 + z_1^2} \qquad \text{(Eq. 5)}$$

$$f_6 = \sqrt{x_4^2 + (y_4 - y_0)^2 + z_4^2} - \sqrt{x_1^2 + (y_1 - y_0)^2 + z_1^2} \qquad \text{(Eq. 6)}$$

At calibration reference point $P_2$:

$$f_7 = \sqrt{(x_2 + x_0)^2 + (y_2 - y_0)^2 + (z_2 - z_0)^2} - \sqrt{(x_1 + x_0)^2 + (y_1 - y_0)^2 + (z_1 - z_0)^2} \qquad \text{(Eq. 7)}$$

$$f_8 = \sqrt{(x_3 + x_0)^2 + (y_3 - y_0)^2 + (z_3 - z_0)^2} - \sqrt{(x_1 + x_0)^2 + (y_1 - y_0)^2 + (z_1 - z_0)^2} \qquad \text{(Eq. 8)}$$

$$f_9 = \sqrt{(x_4+x_0)^2+(y_4-y_0)^2+(z_4-z_0)^2} - \sqrt{(x_1+x_0)^2+(y_1-y_0)^2+(z_1-z_0)^2} \quad \text{(Eq. 9)}$$

At calibration reference point $P_3$:

$$f_{10} = \sqrt{(x_2+x_0)^2+y_2^2+(z_2-z_0)^2} - \sqrt{(x_1+x_0)^2+y_1^2+(z_1-z_0)^2} \quad \text{(Eq. 10)}$$

$$f_{11} = \sqrt{(x_3+x_0)^2+y_3^2+(z_3-z_0)^2} - \sqrt{(x_1+x_0)^2+y_1^2+(z_1-z_0)^2} \quad \text{(Eq. 11)}$$

$$f_{12} = \sqrt{(x_4+x_0)^2+y_4^2+(z_4-z_0)^2} - \sqrt{(x_1+x_0)^2+y_1^2+(z_1-z_0)^2} \quad \text{(Eq. 12)}$$

One embodiment uses the Levenberg-Marquardt (LM) algorithm to compute positioning, which is an iterative technique that locates the minimum of a multivariate function that is expressed as the sum of squares of non-linear real-valued functions. It is a standard technique for non-linear least-squares problems. The LM algorithm can be considered a combination of steepest descent and the Gauss-Newton method. The LM algorithm receives, as input, a vector function f, a measurement vector x, and initial parameters estimate $p_0$, and produces, as output, a vector p minimizing sum of $(x-f(p))^2$.

After the calibration procedure completes, the positions of the receiver antennae 16 are provided. In one embodiment, the computing system 20 computes the position (x, y, z) of the tracked device 12 by using equations with the calibrated known relative three-dimensional positions of the receiver antennae 16. To solve these equations, the computing system 20 uses the time difference of arrival information received from the controller unit 18. An example of the tracking equations, where the subscript 1 represents the reference receiver antenna 16-1, and subscripts 2, 3, and 4 represent the other receiver antennae 16-2, 16-3, 16-4, is below:

$$f_1 = \sqrt{(x_2-x)^2+(y_2-y)^2+(z_2-z)^2} - \sqrt{(x_1-x)^2+(y_1-y)^2+(z_1-z)^2} \quad \text{(Eq. 13)}$$

$$f_2 = \sqrt{(x_3-x)^2+(y_3-y)^2+(z_3-z)^2} - \sqrt{(x_1-x)^2+(y_1-y)^2+(z_1-z)^2} \quad \text{(Eq. 14)}$$

$$f_3 = \sqrt{(x_4-x)^2+(y_4-y)^2+(z_4-z)^2} - \sqrt{(x_1-x)^2+(y_1-y)^2+(z_1-z)^2} \quad \text{(Eq. 15)}$$

where ($x_i$, $y_i$, $z_i$, i=1, 2, 3, 4) are the solution from the calibration procedure (i.e., the now known positions of the receiver antennae 16), and (x, y, z) is the position of the RF transmitter 12 to be computed. $f_1$, $f_2$, and $f_3$ are the measured differences in distance calculated from the time of arrival information (or phase difference information) between receiver antennae 16-1 and 16-2, receiver antennae 16-1 and 16-3, and receiver antennae 16-1 and 16-4, respectively. These equations can be solved using a Kalman filter, a least squares minimization algorithm, or other linear algebra techniques to calculate the (x, y, z) position of the tracked device.

Figure 5:
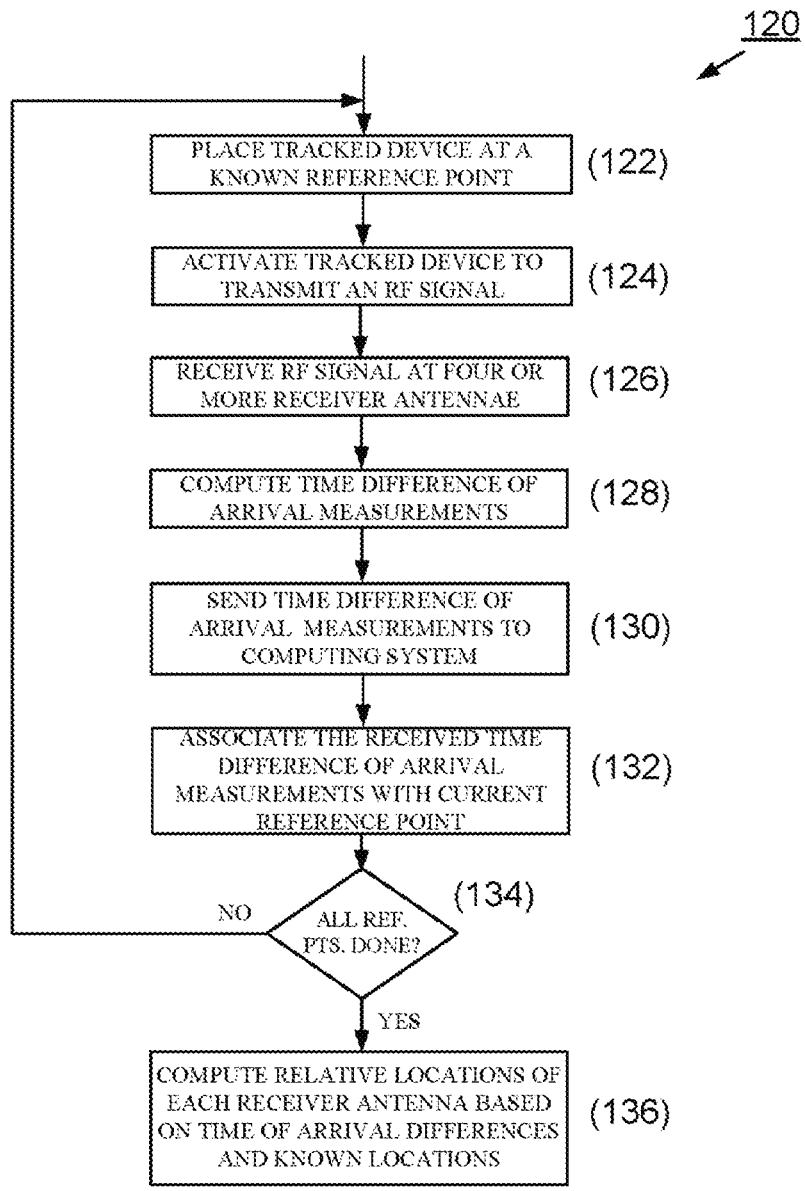
FIG. 5 is a flow diagram of an embodiment of a process for calibrating the locations of receiver antennae in a receiver network.

FIG. 5 shows an embodiment of a process 120 for calibrating the locations of the receiver antennae 16. At step 122, the tracked device 12 is placed at one of the reference points P of the calibration apparatus 80 (FIG. 4). After being positioned at the reference point, the tracked device 12 is activated (step 124), for example, by the press of a button on the device, to transmit an RF signal. Each of the receiver antennae 16 receive (step 126) the RF signal, which pass to the controller unit 18.

At step 128, the controller unit 18 computes time difference of arrival for the RF signal between a chosen reference receiver antenna and each of the other receiver antennae. In one embodiment, the controller unit 18 computes (step 128) the time difference of arrival for the carrier signal and the spread signal obtained from the RF signal, as described in connection with FIG. 3. The controller unit 18 sends (step 130) this set of time difference of arrival measurements to the computing system 20. The computing system 20 associates (step 132) this set of time difference of arrival measurements with the particular known reference point from which the RF signal originated. In one embodiment, the computing system 20 is configured to associate received sets of time difference of arrival measurements with known reference points according to a predefined sequence. For example, the first set of received time difference of arrival measurements is associated with reference point $P_0$, the second received set with reference point $P_1$, and so on.

At step 134, a determination is made whether the calibration process was performed at all or a sufficient number of reference points P. A calibration application executing on the tracked device 12 can guide the user to move the tracked device 12 from one reference point on the calibration apparatus 80 to the next. Alternatively, the calibration apparatus 80 itself can signal to the user where to next place the tracked device 12. After calibration steps (122-130) are performed for all desired reference points P, the computing system 20 computes (step 136) the relative locations of each receiver antenna 16 based on the sets of time difference of arrival measurements and on the known locations of the used reference points, as described in connection with FIG. 4.

Figure 6:
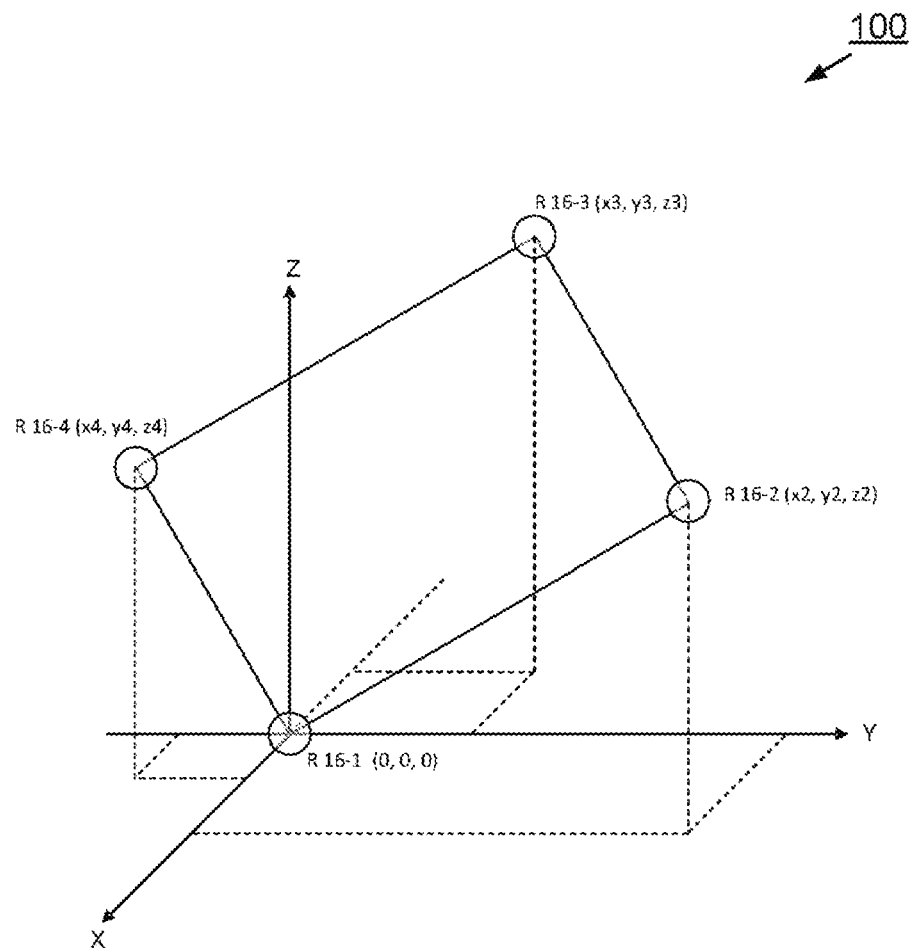
FIG. 6 is a diagram of an embodiment of a rigid receiver antennae arrangement.

FIG. 6 shows an example embodiment having rigidly mounted receiver antennae 16. In one embodiment, the receiver antenna 16-1, as a reference point, is chosen to be at the origin of the coordinate system. In this embodiment, the physical spacing information between the receiver antennae is known; namely, the coordinates of receiver antenna 16-2, receiver antenna 16-3, and receiver antenna 16-4 are known relative to the reference point (i.e., receiver antenna 16-1). Accordingly, calibration is not required because the positions of the receiver antennae are known.

After the positions of the receiver antennae 16 are known, either through the calibration process or through an existing known rigid receiver antennae configuration, one of the receiver antennae (e.g., 16-1) coordinates is taken to be the reference point at origin (0, 0, 0) and the positions of the other receiver antenna 16-2, 16-3, and 16-4 are considered to be at ($x_2$, $y_2$, $z_2$), ($x_3$, $y_3$, $z_3$), and ($x_4$, $y_4$, $z_4$), respectively. The position of the RF transmitter 12 (or tracked device) can then be tracked.

The position calculation function f is described in the "Tracking Equation" below:

$$f_1 = \sqrt{(x_2-x)^2+(y_2-y)^2+(z_2-z)^2} - \sqrt{x^2+y^2+z^2} \quad \text{(Eq. 16)}$$

$$f_2 = \sqrt{(x_3-x)^2+(y_3-y)^2+(z_3-z)^2} - \sqrt{x^2+y^2+z^2} \quad \text{(Eq. 17)}$$

$$f_3 = \sqrt{(x_4-x)^2+(y_4-y)^2+(z_4-z)^2} - \sqrt{x^2+y^2+z^2} \quad \text{(Eq. 18)}$$

where x, y, z are the coordinates of the RF transmitter 3D position relative to the origin receiver antenna 16-1 at (0, 0, 0).

Referring to FIG. 1 and FIG. 4, in another embodiment, when the RF-transmitting device 12 is placed at one of the reference points P and activated to transmit an RF signal, for example, by the press of a button, the device transmits an ultra-wideband (UWB) signal. The UWB signal carries a timestamp corresponding to when the device 12 transmitted the RF signal. In this embodiment, the four receivers (herein, used interchangeably with receiver antennae 16) are synchronized, operating from the same clock (i.e., crystal oscillator). Each of the receiver antennae 16 receive the UWB signal. Each receiver antenna generates a timestamp when that receiver antenna received the UWB signal from the RF-transmitting device. The controller unit 18 acquires the timestamps of the RF-transmitting device and the timestamps of the four receiver antennae. Based on these timestamps, the controller unit 18 computes a one-way time of arrival (TOA) measurement from the RF-transmitting device to each receiver:

$$t = (t_r + \Delta t_r) - (t_t + \Delta t_t),  \quad \text{(Eq. 19)}$$

where $t_r$ is the timestamp of a receiver, $\Delta t_r$ is the receiver jitter or draft error, and $t_t$ is the timestamp of the RF-transmitting device, $\Delta t_t$ is the RF transmitter jitter or draft error.

Because of crystal frequency jitter or draft error that occurs at the RF-transmitting device and the receivers, and because the RF-transmitting device is not synchronized with the synchronized receivers, the time difference measurement can be inaccurate, making individual range measurements unreliable, although the receivers are synchronized. Notwithstanding, using time difference of arrival (TDOA) technology, the set of range measurements to the four receivers can be used to calibrate the position-tracking system (i.e., to determine the relative locations of the four receiver antennae).

To illustrate, at reference point $P_0$, the four TOA measurements are:

$$t_j = (t_{rj} + \Delta t_{rj}) - (t_t + \Delta t_t), \quad \text{(Eq. 20)}$$

where the index value, j, identifies the given receiver antenna, and $j \in (0,3)$.

From these four equations there can be made three delta functions. For example, using receiver antenna 0 as a reference, three equations are:

$$\Delta t_{10} = t_1 - t_0 = ((t_{r1} - \Delta t_{r1}) - (t_t - \Delta t_t)) - ((t_{r0} - \Delta t_{r0}) - (t_t - \Delta t_t)) \quad \text{(Eq. 21)}$$

which reduces to: $\Delta t_{10} = (t_{r1} - t_{r0}) - (\Delta t_{r1} - \Delta t_{r0})$ (Eq. 22)

The other two equations for receiver antenna 0 as the reference are:

$$\Delta t_{20} = (t_{r2} - t_{r0}) - (\Delta t_{r2} - \Delta t_{r0}) \quad \text{(Eq. 23)}$$

$$\Delta t_{30} = (t_{r3} - t_{r0}) - (\Delta t_{r3} - \Delta t_{r0}) \quad \text{(Eq. 24)}$$

Because all receivers are synchronized, then $\Delta t_{ri}$, where $i \in (0,3)$, has identical values in equations 22, 23, and 24, and thus these equations reduce to:

$$\Delta t_{10} = (t_{r1} - t_{r0}) \quad \text{(Eq. 25)}$$

$$\Delta t_{20} = (t_{r2} - t_{r0}) \quad \text{(Eq. 26)}$$

$$\Delta t_{30} = (t_{r3} - t_{r0}) \quad \text{(Eq. 27)}$$

Equations 25, 26 and 27 show that the effect of jitter or draft error has been removed from the calculations, and thus these time difference of arrival measurements can be used to perform automatic setup calibration. The distance equations for computing the relative position of the receiver antennae are the same as those described previously in connection with time difference of arrival measurements, namely equations 1-12. To illustrate using equations 1-3 as examples for calibration reference point $P_0$:

$$d_{10} = \Delta t_{10} * c = \sqrt{x_2^2 + y_2^2 + z_2^2} - \sqrt{x_1^2 + y_1^2 + z_1^2}$$

$$d_{20} = \Delta t_{20} * c = \sqrt{x_3^2 + y_3^2 + z_3^2} - \sqrt{x_1^2 + y_1^2 + z_1^2}$$

$$d_{30} = \Delta t_{30} * x = \sqrt{x_4^2 + y_4^2 + z_4^2} - \sqrt{x_1^2 + y_1^2 + z_1^2}$$

Figure 7:
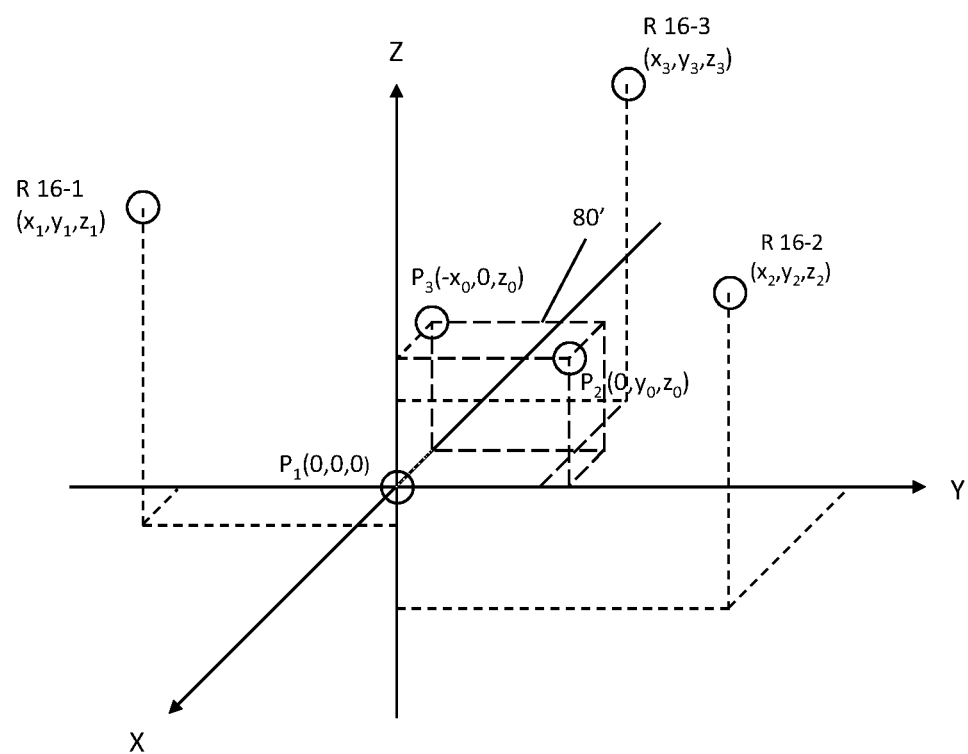
FIG. 7 is a diagram of another embodiment of arbitrarily positioned receiver antennae and a transmitter calibration template.

FIG. 7 shows an embodiment of three randomly positioned receiver antennae 16-1, 16-2, and 16-3, and a calibration apparatus 80' having a calibration template comprised of three reference points $P_1$, $P_2$, and $P_3$. Although three antennae and three reference points are shown, the principles described herein apply to embodiments with more than three reference points and more than three receiver antennae. In the example of FIG. 7, the receiver antenna 16-1 is positioned at $(x_1, y_1, z_1)$, the receiver antenna 16-2 is at $(x_2, y_2, z_2)$, and the receiver antenna 16-3 is at $(x_3, y_3, z_3)$, all of which are at random or arbitrary locations (i.e., initially unknown) with respect to the calibration apparatus 80'.

The calibration apparatus 80' can be one or more devices, machines separate from or part of the receiver station 15 (FIG. 1), examples of which include, but are not limited to, a television and computer monitor. The calibration apparatus 80' provides a calibration template, defined as the three geometric reference points $P_1$, $P_2$, and $P_3$ disposed on or in the calibration apparatus 80' known to the receiver station 15. For example, each of the corners of a computer monitor can be adapted to be part of calibration template, used to calibrate the position tracking system for certain functions, as such functions relate to the dimensions of this calibration apparatus.

During an initial calibration of the positions of the receiver antennae 16, the tracked device 12 (i.e., RF-transmitting device of FIG. 1) is placed, in succession, at each of these reference points, either on, in, or against the calibration apparatus. At each of these reference points, the tracked device transmits an ultra-wideband (UWB) signal, which carries a timestamp corresponding to when the tracked device 12 transmitted the RF signal. Each of the receiver antennae 16 receives the UWB signals transmitted by the tracked device. Time of arrival (TOA) measurements are used to calculate the relative positions of each receiver antenna 16 in the receiver network 14 (FIG. 1, minus the fourth antenna 16-4). These TOA measurements can be based on one-way communications from the tracked device 12 to each of the receivers 16 or on two-way handshake between the tracked device 12 and each receiver 16.

In the instance of the two-way handshake, the tracked device 12 is configured with an RF receiver (not shown) to receive UWB signals back from the receivers 16. (This RF receiver can be part of an RF transceiver that provides the RF transmitter of the RF-transmitting device). Based on round-trip times determined from the timestamps included in the UWB signals (by the tracked device and by the receivers), a processor (not shown) of the RF-transmitting device computes the distance (i.e., range) to each receiver antenna, and can then use the three computed ranges to the receivers to triangulate its own (x, y, z) position in relation to the receivers. The RF-transmitting device 12 performs this computation at each of the three reference points where the tracked device is placed in succession. The RF-transmitting device 12 transmits these computed ranges to the controller unit 18 (FIG. 1), for forwarding to the computing system 20, which computes the relative positions of the receiver antennae based on these ranges. Alternatively, the tracked device 12 can transmit the timestamps back to the controller unit 18 so the computing system 20 can perform the range calculations and then the relative positions of the receiver antennae based on these ranges.

In the example shown in FIG. 7, the calibration template 80' includes three predetermined locations, referred to previously as the reference points $P_1$, $P_2$, and $P_3$. $P_1$ is placed located at the origin (0, 0, 0), and the other two positions $P_2$, and $P_3$ of the calibration template are located at (0, $y_0$, $z_0$), and (−$x_0$, 0, $z_0$), respectively. Each of these reference points $P_1$, $P_2$, and $P_3$ is known relative to each other by the receiver station 15, being stored in the memory of the receiver station. More than three points can be used as reference points, for example, at the middle of each edge of the calibration apparatus 80'.

In an embodiment with three receiver antennae 16-1, 16-2, and 16-3, there are 9 unknown parameters, and, therefore, at least 9 equations are needed to resolve the relative position of each receiver antenna 16. At each calibration reference point P, there are three equations, so at least three calibration reference points are needed.

The computing system 20 uses the following simultaneous equations to compute locations of the receiver antennae, where $d_{11}$, $d_{12}$ . . . through $d_{33}$ are the distances of the antennae locations in relation to the calibration reference points $P_1$, $P_2$, and $P_3$. As representative examples, $d_{11}$ is the distance of the reference point $P_1$ from the receiver antennae 16-1, $d_{12}$ is the distance of the reference point $P_1$ from the receiver antennae 16-2, $d_{13}$ is the distance of the reference point $P_1$ from the receiver antennae 16-3, $d_{21}$ is the distance of the reference point $P_2$ from the receiver antennae 16-1, and $d_{31}$ is the distance of the reference point $P_3$ from the receiver antennae 16-1. Each distance (d) is based on the time of arrival (t) measurement made at each antenna (d=t*c), where c is equal to the speed of light.

At calibration reference point $P_1$:

$$d_{11} = \sqrt{x_1^2 + y_1^2 + z_1^2} \quad \text{(Eq. 28)}$$

$$d_{12} = \sqrt{x_2^2 + y_2^2 + z_2^2} \quad \text{(Eq. 29)}$$

$$d_{13} = \sqrt{x_3^2 + y_3^2 + z_3^2} \quad \text{(Eq. 30)}$$

At calibration reference point P2:

$$d_{21} = \sqrt{x_1^2 + (y_1-y_0)^2 + (z_1-z_0)^2} \quad \text{(Eq. 31)}$$

$$d_{22} = \sqrt{x_2^2 + (y_2-y_0)^2 + (z_2-z_0)^2} \quad \text{(Eq. 32)}$$

$$d_{23} = \sqrt{x_3^2 + (y_3-y_0)^2 + (z_3-z_0)^2} \quad \text{(Eq. 33)}$$

At calibration reference point P3:

$$d_{31} = \sqrt{(x_1+x_0)^2 + y_1^2 + (z_1-z_0)^2} \quad \text{(Eq. 34)}$$

$$d_{32} = \sqrt{(x_2-x_0)^2 + y_2^2 + (z_2-z_0)^2} \quad \text{(Eq. 35)}$$

$$d_{33} = \sqrt{(x_3+x_0)^2 + y_3^2 + (z_3-z_0)^2} \quad \text{(Eq. 36)}$$

One embodiment uses the Levenberg-Marquardt (LM) algorithm to solve the nine equations numbered 28-36 to produce the relative locations of the receiver antennae in three-dimensional coordinates.

To arrive at a solution requires that the reference points not all be on a plane that mirrors (i.e., is parallel) the plane of the receiver antennae (if the receiver antennae are coplanar). In other words, if the receiver antennae are coplanar (in this context, meaning all antennae have the same value for one of its x, y, or z axes), the reference points cannot all have a common value for that same axis. For example, if the z-axis value for all reference antennae is equal to 10, then the reference points cannot all have a common z-axis value (e.g., their z-axis values cannot all be equal to 8, or all equal to 14, or to 6). In this example, at least one of the z-axis values of the reference points must be different from the z-axis values of the other reference points. If the three receiver antennae are non-coplanar (in this context meaning not all antennae have the same value for one of its x, y, or z axes), for example, because of arbitrary placement, the reference points can be coplanar or non-coplanar.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A calibration system for calibrating a position tracking system used to track a physical location of a radio frequency (RF) transmitter, the calibration system comprising:
    an RF transmitter transmitting an RF signal from each of a plurality of locations where the RF transmitter is placed in successive order;
    at least three RF receiver antennae disposed at undetermined locations receiving the RF signals transmitted from the plurality of locations;
    a calibration apparatus configured to provide a calibration template with a predetermined set of reference points, each reference point corresponding to one of the plurality of locations where the RF transmitter is placed in successive order and from which the RF transmitter transmits the RF signal; and
    a receiver station in communication with the at least three RF receiver antennae, the receiver station being configured to know where each reference point is located on the calibration template, the receiver station initially calibrating a relative position of each RF receiver antenna with respect to each other RF receiver antenna based on the plurality of locations and on information acquired in response to the RF signal transmitted by the RF transmitter from each of the plurality of locations and received by the at least three RF receiver antennae.

2. The calibration system of claim 1, wherein the set of reference points comprises three or more reference points.

3. The calibration system of claim 1, wherein each RF signal transmitted by the RF transmitter carries a timestamp corresponding to when the RF transmitter transmitted that RF signal and each of the at least three receiver antennae generates a timestamp corresponding to when that receiver antenna received that RF signal from the RF transmitter, and further comprising a processing unit that computes time of arrival measurements for each RF signal transmitted by the RF transmitter based on the timestamp carried by that RF signal and on the timestamps generated by each of the at least three RF receiver antennae when that receiver antenna received that RF signal from the RF transmitter.

4. The calibration system of claim 3, further comprising a device that includes the RF transmitter, an RF receiver configured to receive RF signals from the at least three receiver antennae that carry the timestamps generated by the at least three receiver antennae, and the processing unit that computes the time of arrival measurements.

5. The calibration system of claim 4, wherein the processing unit of the device computes a position of the device based on the time of arrival measurements.

6. The calibration system of claim 4, wherein the receiver station is in wireless communication with the device to receive the time of arrival measurements computed by the processing unit of the device, the receiver station comprising a computing system that determines the relative position of each RF receiver antenna with respect to each other RF receiver antenna based on the computed time of arrival measurements.

7. The calibration system of claim 4, wherein the receiver station is in wireless communication with the device to receive the timestamp carried by each RF signal transmitted by the RF transmitter and the timestamps generated by each of the at least three RF receiver antennae when that receiver antenna received that RF signal from the RF transmitter, the receiver station comprising the processing unit that computes the time of arrival measurements based on the received timestamps.

8. The calibration system of claim 1, wherein the receiver station is configured to compute dynamically a position of an RF-transmitting device based on the calibrated relative positions of the RF receiver antennae.

9. The calibration system of claim 1, wherein the set of reference points comprises at least four reference points, the at least three receiver antennae comprises at least four receiver antennae, each RF signal carries a timestamp corresponding to when the RF transmitter transmitted that RF signal, each of the at least four receiver antennae generates a timestamp corresponding to when that receiver antenna received that RF signal from the RF transmitter, and the receiver station computes time difference of arrival measurements based on the plurality of locations and on the timestamps, and determines the relative position of each of the at least four RF receiver antennae with respect to each other of the at least four RF receiver antennae based on the computed time difference of arrival measurements and on the plurality of locations.

10. A method for calibrating a position tracking system used to track a physical location of a radio frequency (RF) transmitter, the method comprising:
  receiving, by at least three RF receiver antennae disposed at undetermined locations, an RF signal transmitted from each of a plurality of locations in successive order by an RF transmitter;
  positioning a calibration template with a predetermined set of reference points at known locations relative to a given reference point such that each reference point of the predetermined set of reference points corresponds to one of the plurality of locations from which the RF transmitter transmits the RF signal; and
  calibrating a relative position of each of the at least three RF receiver antennae with respect to each other of the at least three RF receiver antennae based on the plurality of locations and information acquired in response to the RF signals received at the at least three RF receiver antennae.

11. The method of claim 10, wherein the set of reference points comprises three or more reference points.

12. The method of claim 10, wherein each RF signal transmitted by the RF transmitter carries a timestamp corresponding to when the RF transmitter transmitted that RF signal and each of the at least three receiver antennae generates a timestamp corresponding to when that receiver antenna received that RF signal from the RF transmitter.

13. The method of claim 12, further comprising the step of computing time of arrival measurements for each RF signal transmitted by the RF transmitter based on the timestamp carried by that RF signal and on the timestamps generated by each of the at least three RF receiver antennae when that receiver antenna received that RF signal from the RF transmitter.

14. The method of claim 13, further comprising the step of computing a position of the tracked device based on the time of arrival measurements.

15. The method of claim 10, further comprising the step of computing a position of the RF transmitter relative to the at least three receiver antennae based on the calibrated relative positions of the at least three receiver antennae.

16. The method of claim 10, wherein the set of reference points comprises at least four reference points and the at least three receiver antennae comprises at least four receiver antennae, and further comprising the steps of:
  carrying a timestamp in each RF signal transmitted by the RF transmitter that corresponds to when the RF transmitter transmitted that RF signal and generating, by each of the at least four receiver antennae, a timestamp corresponding to when that receiver antenna received that RF signal from the RF transmitter;
  computing time difference of arrival measurements based on the plurality of locations and on the timestamps; and
  determining the relative position of each of the at least four RF receiver antennae with respect to each other of the at least four RF receiver antennae based on the computed time difference of arrival measurements and on the plurality of locations.

17. A calibration system for calibrating a position tracking system used to track a physical location of a radio frequency (RF)-transmitting tracked device, the position tracking system having at least three RF receiver antennae, the calibration system comprising:
  a receiver station in communication with the at least three RF receiver antennae disposed at undetermined locations, the receiver station being configured to compute a set of timing measurements for each of at least three different transmissions of RF signals transmitted from at least three different locations in successive order by the RF-transmitting tracked device and received at each of the at least three RF receiver antennae, the receiver station being further configured to store in memory a position location for each of the at least three different locations, to associate each set of timing measurements with one of the at least three different locations, and to compute a relative position of each of the at least three RF receiver antennae with respect to each other of the at least three RF receiver antennae based on the at least three different locations and the sets of timing measurements; and
  a calibration apparatus configured to provide a calibration template with a predetermined set of reference points, the calibration apparatus being disposed relative to the receiver station such that each reference point is located at a different one of the at least three position locations stored in the memory and corresponds to one of the at least three different locations from which the RF-transmitting tracked device transmitted RF signals.

18. The calibration system of claim 17, wherein:
  each RF signal transmitted by the RF-transmitting tracked device carries a timestamp corresponding to when the RF-transmitting tracked device transmitted that RF signal and each of the at least three receiver antennae generates a timestamp corresponding to when that receiver antenna received that RF signal from the RF-transmitting tracked device; and
  the receiver station is configured to compute time of arrival measurements for each RF signal transmitted by the RF-transmitting tracked device based on the timestamp carried by that RF signal and on the timestamps generated by each of the at least three RF receiver antennae when that receiver antenna received that RF signal from the RF transmitter.

19. The calibration system of claim 17, wherein:
  the predetermined set of reference points comprises at least four reference points and the at least three RF receiver antennae comprises at least four RF receiver antennae;
  each RF signal transmitted by the RF-transmitting tracked device carries a timestamp in that corresponds to when the RF transmitter transmitted that RF signal and each of the at least four receiver antennae generates a timestamp corresponding to when that receiver antenna received that RF signal transmitted by the RF-transmitting tracked device; and
  the receiver station is configured to compute time difference of arrival measurements based on the position locations and on the timestamps and to determine the relative position of each of the at least four RF receiver antennae with respect to each other of the at least four RF receiver antennae based on the computed time difference of arrival measurements and on the position locations.

20. The calibration system of claim 17, wherein the receiver station is configured to compute the physical location of the RF-transmitting tracked device based on the computed relative positions of the at least three RF receiver antennae.

* * * * *